United States Patent [19]

Hatano et al.

[11] Patent Number: 5,969,037
[45] Date of Patent: Oct. 19, 1999

[54] ROOM TEMPERATURE CURING COMPOSITION

[75] Inventors: Takanori Hatano; Naotami Ando, both of Hyogo, Japan

[73] Assignee: Kanegafuchi Chemical Industry Co., Ltd., Osaka, Japan

[21] Appl. No.: 09/000,325

[22] PCT Filed: Aug. 2, 1996

[86] PCT No.: PCT/JP96/02181

§ 371 Date: Feb. 25, 1998

§ 102(e) Date: Feb. 25, 1998

[87] PCT Pub. No.: WO97/06193

PCT Pub. Date: Feb. 20, 1997

[30] Foreign Application Priority Data

Aug. 4, 1995 [JP] Japan ................................. 7-199939

[51] Int. Cl.$^6$ ............................................. C08L 43/04
[52] U.S. Cl. ........................... 524/806; 526/279; 523/201
[58] Field of Search ............................ 524/806; 526/279; 523/201

[56] References Cited

U.S. PATENT DOCUMENTS

| | | | |
|---|---|---|---|
| 5,332,766 | 7/1994 | Takaya et al. | 523/201 |
| 5,668,194 | 9/1997 | Ando et al. | 523/201 |
| 5,708,093 | 1/1998 | Bastelberger et al. | 525/288 |
| 5,852,095 | 12/1998 | Yamauchi et al. | 524/460 |

FOREIGN PATENT DOCUMENTS

| | | |
|---|---|---|
| 0621325 | 10/1994 | European Pat. Off. . |
| 4306831 | 9/1994 | Germany . |
| 2-92974 | 4/1990 | Japan . |
| 6-306123 | 11/1994 | Japan . |
| 8-20617 | 1/1996 | Japan . |

OTHER PUBLICATIONS

Bourne T. R. et al.: "Feasibility of Using Alkoxysilane–functional Monomers for the Development of Crosslinkable Emulsions" Journal of Coatings Technology, vol. 54, No. 684, Jan. 1982, pp. 69–82, XP000196796 * p. 1, col. 1, line 1—col. 2, line 10.

*Primary Examiner*—Melvyn I. Marquis
*Assistant Examiner*—Mark W. Milstead
*Attorney, Agent, or Firm*—Jordan and Hamburg LLP

[57] ABSTRACT

A room temperature curing composition of this invention comprises an emulsion obtained by multi-stage emulsion polymerization of monomers, the emulsion comprising emulsion particles, a core of which comprises (A) 1 to 30% by weight of silyl group-containing vinyl monomer, (B) 70 to 99% by weight of vinyl monomer copolymerizable with component (A), the outermost shell of which comprises (A) 0.1 to 30% by weight of silyl group-containing vinyl monomer and (B) 40 to 99.4% by weight of vinyl monomer copolymerizable with component (A), and (D) 0.5 to 30% by weight of hydrophilic vinyl monomer. The room temperature curing composition of this invention has a stable silyl group, and a much improved film-forming ability after long-term storage and it also shows excellent mechanical stability, water-resistance, durability and white enamel gloss.

6 Claims, No Drawings

ROOM TEMPERATURE CURING COMPOSITION

FIELD OF THE INVENTION

This invention relates to a room temperature curing composition for various coating systems, particularly for weather-resistant, durable coatings, to be applied to outer surfaces of architectural structures, automobiles, household electric appliances, plastic products and so on.

BACKGROUND OF THE INVENTION

Recently, in the field of coatings and adhesives, organic solvent-based systems are being replaced with water-soluble or dispersible systems as an anti-pollution measure or resource saving.

However, the conventional water-based coatings have disadvantages in that, since they have no crosslinkable functional group in the molecules, they are subject to the strong influence of surfactants used in the polymerization, which remarkably deteriorate the weatherability, water resistance and stain resistance of formed coating films, resulting in inferior film performances as compared with solvent-based paints.

Therefore, to provide crosslinkable functional groups in the molecules, an application of an alkoxysilyl group-containing emulsion to the field of coatings has been proposed. However, the alkoxysilyl group is easily hydrolyzed in the presence of water so that the film-forming performance of the emulsion is deteriorated considerably after aging and, moreover, the emulsion is poor in mechanical stability and white enamel gloss.

SUMMARY OF THE INVENTION

As a result of making intensive studies in order to solve above problems, inventors of the present invention have found that when multi-stage emulsion polymerization is performed, and polymerizable monomers containing an alkoxysilyl group which is relatively stable against hydrolysis (e.g. triethoxysilyl group, diethoxysilyl group, tripropoxysilyl group, dipropoxysilyl group) are introduced to emulsion particles as a reactive silyl group, the stability of the silyl groups is remarkably enhanced so that the silyl groups are prevented from hydrolysis in the course of polymerization or during storage. Additionally when hydrophilic groups are introduced into the outermost shell layer of the emulsion particles, the mechanical stability and white enamel gloss are both remarkably improved. This invention has been developed on the basis of the above findings.

This invention is, therefore, directed to a room temperature curing composition comprising an emulsion obtained by a multi-stage emulsion polymerization of the plurality of constituent monomers, wherein the core monomer composition of emulsion particles comprises 1 to 30 weight % of (A) a silyl group-containing vinyl monomer of the general formula (I) and 70 to 99 weight % of (B) at least one vinyl monomer copolymerizable with the above-mentioned component (A), and the outer shell monomer composition of the emulsion particles comprises 0.1 to 30 weight % of (A) a silyl group-containing vinyl monomer of the general formula (I), 40 to 99.4 weight % of (B) at least one vinyl monomer copolymerizable with the above-mentioned component (A) and 0.5 to 30 weight % of (D) at least one hydrophilic vinyl monomer selected from the group consisting of α,β-ethylenically unsaturated carboxylic acid, styrenesulfonic acid, vinylsulfonic acid, sodium styrenesulfonate, 2-sulfoethyl methacrylate sodium, 2-sulfoethyl methacrylate ammonium, (meth)acrylamide, N-methylol(meth)acrylamide, dialkylaminoalkyl methacrylates, dialkylaminoalkyl methacrylate hydrochlorides, 2-aminoethyl methacrylate hydrochloride, polyethoxylated vinyl monomers and polypropoxylated vinyl monomers;

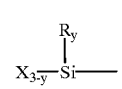
(I)

wherein R is a monovalent hydrocarbon group, selected from alkyl group having 1 to 10 carbon atoms, aryl group and aralkyl group, X is a group selected from ethoxy, n-propoxy and i-propoxy groups, y is an integer of 0 to 2; in the case where two or more R or X groups are bound to Si respectively, they may be the same or different.

The vinyl monomer (B) of the above-mentioned outermost shell preferably comprises of 10 to 75 weight % of component (C) based on the total monomer amount of the outermost shell. The component (C) is at least one monomer selected from alkyl methacrylates whose alkyl moieties contain no fewer than 4 carbon atoms each and cycloalkyl methacrylates whose cycloalkyl moieties contain no fewer than 4 carbon atoms.

In the examples of component (D), (meth)acrylamide represents acrylamide or methacrylamide, N-methylol (meth)acrylamide represents N-methylolacrylamide or N-methylolmethacrylamide respectively, hereinafter referred to in the same manner.

DETAILED DESCRIPTION AND BEST MODE FOR PRACTICING THE INVENTION

The vinyl monomers (A), (B), (C) and (D) are now described in detail respectively.

(A) Silyl group-containing vinyl monomer

The silyl group-containing monomer (A) of general formula (I) is not particularly limited. As examples of the monomer (A), mentioned are the following

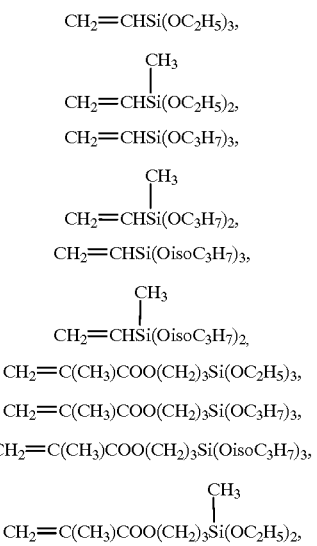

-continued

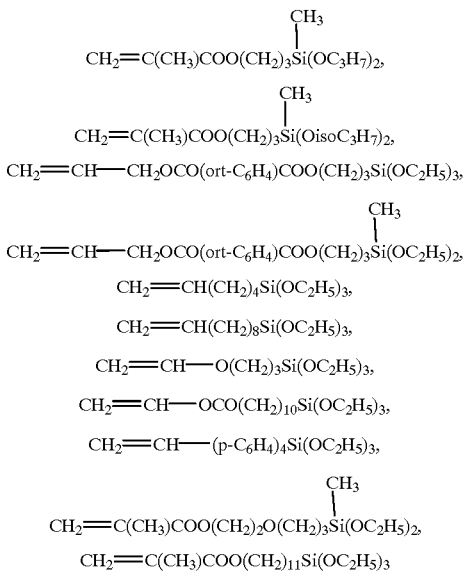

The silyl group-containing vinyl monomers may be used alone or in admixture thereof.

For the core, the silyl group-containing vinyl monomer (A) is copolymerized in the proportion of 1 to 30% (by weight %; hereinafter the same). When the proportion of monomer (A) for the core is less than 1%, the water-resistance and durability tend to be deteriorated. And when the proportion of monomer (A) is more than 30%, the emulsion tends to be unstable, and gelation occurs during the polymerization of the core. For the outermost shell, the silyl group-containing vinyl monomer (A) is copolymerized in the proportion of 0.1 to 30%. When the proportion of monomer (A) for the outermost shell is less than 0.1%, the durability and water-resistance may be deteriorated due to the absence of the crosslinking among particles. When the proportion of monomer (A) is more than 30%, the emulsion becomes unstable.

(B) Vinyl monomer copolymerizable with (A)

The vinyl monomer (B) copolymerizable with the above-mentioned monomer (A) is not limited to a particular species. As examples, mentioned are (meth)acrylate monomers, such as, methyl(meth)acrylate, ethyl(meth) acrylate, n-butylacrylate, iso-butylacrylate, tert-butylacrylate, benzyl(meth)acrylate, fluorine-containing vinyl monomers, such as, hexafluoropropyrene, chlorotrifluoroethylene, vinylidene fluoride, trifluoroethylene, tetrafluoroethylene, pentafluoropropyrene, trifluoro(meth)acrylate, pentafluoro(meth)acrylate, perfluorocyclohexyl(meth)acrylate, 2,2,3,3-tetrafluoropropylmethacrylate, β-(perfluorooctyl)ethyl (meth)acrylate, aromatic hydrocarbon vinyl monomers such as styrene, α-methylstyrene, chlorostyrene, 4-hydroxystyrene, vinyl-toluene, vinyl esters and allyl compounds such as vinyl acetate, vinyl propionate, and diallyl phthalate, nitrile group-containing vinyl monomers such as (meth)acrylonitrile, epoxy group-containing vinyl monomers such as glycidyl(meth)acrylate, hydroxy group-containing vinyl monomer such as 2-hydroxyethyl(meth) acrylate, 2-hydroxypropyl(meth)acrylate, 2-hydroxyethyl vinyl ether, hydroxystyrene, Aronix 5700 (product of Toagosei Chemical industry Co., Ltd.), Placcel FA-1, Placcel FA-4, Placcel FM-1, Placcel FM-4 (products of Daicel Chemical Industries, Ltd.), HE-10, HE-20, HP-10, HP-20 products of Japan Catalytic Chemical Industry Co., Ltd.), Blemmer PEP series, Blemmer NKH-5050, Blemmer GLM (products of Nippon Oil & Fats Co., Ltd.), hydroxy-containing vinyl type modified hydroxyalkyl vinyl monomers, vinyl compounds which are a condensate of hydroxyalkyl esters of α,β-ethylenically unsaturated carboxylic acids, such as hydroxyalkyl ester of (meth)acrylic acid, with phosphoric acid or phosphoric acid ester, urethane bond- or siloxane bond-containing (meth)acrylate vinyl monomer, macromonomer compounds such as AS-6, AN-6, AA-6, AB-6, AK-5, which are available from Toagosei Chemical industry Co., Ltd., vinyl methyl ether, vinyl chloride, vinylidene chloride, chloroprene, propylene, butadiene, other vinyl monomers, polymeric light stabilizers and polymeric ultraviolet absorbers such as LA87, LA82, LA22, which are available from Asahi Denka Kogyo Co., Ltd.

By using Fluorine-containing vinyl monomer or a siloxane containing vinyl monomer, the water repellency, water resistance and durability are improved.

It is possible to generate crosslinking structure in the obtained polymer by using a monomer containing two or more polymerizable unsaturated bonds, such as polyethylene glycol dimethacrylate, ethylene glycol diacrylate, triallyl cyanurate.

Component (B), including component (C) in the following descriptions, are polymerized 70 to 99% for the core, 40 to 99.4% for the outermost shell.

(C) Alkyl methacrylate whose alkyl moiety has no fewer than 4 carbon atoms and cycloalkyl methacrylate whose cycloalkyl moiety has no fewer than 4 carbon atoms Alkyl methacrylate whose alkyl moiety has no fewer than 4 carbon atoms and cycloalkyl methacrylate whose cycloalkyl moiety has no fewer than 4 carbon atoms (C) are not particularly limited. As examples, mentioned are n-butylmethacrylate, iso-butylmethacrylate, tert-butylmethacrylate, 2-ethylhexylmethacrylate, isodecylmethacrylate, laurylmethacrylate, tridecylmethacrylate, stearylmethacrylate, cyclohexylmethacrylate, isobornyl methacrylate. In the above mentioned examples, n-butylmethacrylate and cyclohexylmethacrylate are preferable from the viewpoints of cost performance, weatherability of the composition, the balance between hardness and impact resistance and ease of control of the glass transition temperature (Tg) of the resin emulsion.

The proportion of component (C) to be copolymerized in the outermost shell of the multi-stage emulsion polymerization is preferably 10 to 75% based on all monomers of the outermost shell, more preferably 10 to 65%, and even more preferably 15 to 55%. When the proportion of component (C) is less than 10%, long-term storage stability may be deteriorated due to hydrolysis and condensation of silyl groups. When the proportion exceeds the upper limit, mechanical stability tends to be deteriorated due to increasing hydrophobicity of the outermost shell of the particles.

The component (C) may be used in the core emulsion polymerization. When the proportion of component (C) is too large, however, the gloss of the formed film and mechanical stability of the paint tend to be deteriorated. Thus the proportion of component (C) is not more than 75% of all monomers used in the core, preferably not more than 65%, more preferably not more than 55% and even more preferably not more than 40%.

(D) Hydrophilic vinyl monomer

The outermost shell of the emulsion particles must contain the hydrophilic vinyl monomer (D), which is selected from α, β-ethylenically unsaturated carboxylic acids, styrenesulfonic acid, vinylsulfonic acid, sodium styrensulfonate, 2-sulfoethyl methacrylate sodium, 2-sulfoethyl methacrylate ammonium, (meth)acrylamide, N-methylol(meth) acrylamide, dialkylaminoalkyl methacrylates, dialkylaminoalkyl methacrylate hydrochlorides, 2-aminoethyl methacrylate hydrochloride, polyoxyethylene chain-containing vinyl monomers and polyoxypropylene chain-containing vinyl monomers.

As examples of α,β-ethylenically unsaturated carboxylic acids, mentioned are (meth)acrylic acid, maleic acid, itaconic acid, crotonic acid, fumaric acid, citraconic acid.

As examples of dialkylaminoalkyl methacrylates and dialkylaminoalkyl methacrylate hydrochlorides, mentioned are dimethylaminoethyl methacrylate, diethylaminoethyl methacrylate, dimethylaminopropyl methacrylate and its hydrochlorides.

Polyoxyethylene chain-containing vinyl monomers are not particularly limited, but polyoxyethylene chain-containing (meth)acrylic esters are preferred. As examples, mentioned are Blemmer PE-90, PE-200, PE-350, PME-100, PME-200, PME-400, AE-350 (products of Nippon Oil and Fats Co., Ltd.), MA-30, MA-50, MA-100, MA-150, RA-1120, RA-2614, RMA-564, RMA-568, RMA-1114, and MPG130-MA (products of Nippon Nyukazai Co., Ltd.).

Polyoxypropyrene chain-containing vinyl monomers are not particularly limited. As examples, mentioned are Blemmer PP-1000, PP-500, PP-800, AP-400 products of Nippon Oil and Fats Co., Ltd.), and RS-30 products of Sanyo Chemical Industries, Ltd.).

The silyl group stability is improved remarkably by using polyoxyethylenyl vinyl monomers as the component (D), and consequently film-forming performance is not deteriorated, and mechanical stability and white enamel gloss are satisfied. The number of oxyethylene units in the polyoxyethylene chain is preferably 2 to 30. If it is less than 2, the mechanical stability and white enamel gloss is deteriorated. If it exceeds 30, the coating film tends to be softened and pick up dirt easily.

The component (D) is copolymerized in the proportion of 0.5 to 30%. If the proportion is less than 0.5%, some properties, such as mechanical stability and white enamel gloss are compromised. If it is more than 30%, the water-resistance is decreased.

The process for production of the emulsion is described in the following section.

As the first stage of polymerization, a mixture of component (A) and (B) is polymerized by a known emulsion polymerization method, and the second and subsequent stages of polymerization are serially carried out in the presence of the obtained polymer (referred to at the core). The monomer composition can be the same or different between the second and subsequent stages of polymerization and the first stage. And the polymer obtained in the last stage of the polymerization is called the outermost shell. In this invention, the outermost shell must contain the component (D) in the proportion of 0.5 to 30%.

The multi-stage polymerization of this invention is conducted in 2 to 4 stages, and it is preferable to polymerize in the manner that the weight ratio of the core to the other part is in the range of 10:90 to 90:10. In this invention, the polymer obtained in the above-mentioned manner is called a multilamellar polymer.

By using polyoxyethylenyl anionic surfactant as the surfactant in the polymerization system, the silyl group is stabilized. As the examples of the anionic surfactant, mentioned are polyoxyethylenenonylphenyl ether sulfate such as Newcol-560SN, Newcol-560SF (products of Nippon Nyukazai Co., Ltd.), Emal NC-35, and Level WZ (products of Kao corporation), polyoxyethyleneallyl ether sulfate, such as, Newcol-707SF, Newcol-707SN, Newcol-723SF, and Newcol-740SF, octylphenoxyethoxyethylsulfonate, such as, Newcol-861SE, and polyoxyethylene-tridecyl ether sulfate, such as, Newcol-1305SN (products of Nippon Nyukazai Co., Ltd.).

The number of oxyethylene units in the polyoxyethylene chain is preferably 1 to 50 to stabilize the polymerization reaction and hydrolyzable silyl groups. Also an anionic surfactant of ammonium salt is preferred from the viewpoint of water resistance of the coating film obtained from the emulsion.

Polyoxyethylene chain-containing anionic surfactant can be used in combination with other ionic or nonionic surfactants.

The other ionic surfactants are not particularly limited. As examples of the surfactants, mentioned are salts of sulfonic acid, such as, sodium laurylsulfonate, sodium dodecylbenzenesulfonate, sodium isooctylbenzene sulfonate.

The nonionic surfactant is not particularly limited. As examples of the surfactant, mentioned are polyoxyethylene compounds, such as polyoxyethylene nonyl phenyl ether, polyoxyethylene lauryl ether, and silicon-containing nonionic surfactants such as L-77, L-720, L-5410, L-7602 and L-7607 (products of Union Carbide Co.)

The use of a reactive surfactant containing a polymerizable double bond within a molecule is also permitted in this invention. Especially by using a reactive surfactant containing a polyoxyethylene group within a molecule, the water resistance is improved. Also the reactive surfactant can be used only in the outermost shell. As examples of such surfactant, mentioned are Adekariasoap NE-10, NE-20, NE-30, NE-40 and SE-10N (products of Asahi Denka Kogyo K.K.), Antox-MS-60 (product of Nippon Nyukazai Co., Ltd.), Aqualon RN-20, RN-30, RN-50, HS-10, HS-20 and, HS-1025 (products of Daiichi Kogyo Seiyaku Co., Ltd.).

The proportion of the polyoxyethylene chain-containing anionic surfactant based on the total monomer weight is 0.01 to 20% and preferably 0.05 to 10%. If the proportion is less than 0.01%, stability during the polymerization reaction is decreased, and if the proportion is more than 20%, the water-resistance is decreased.

Also, a water-soluble resin can be used additionally in the polymerization system. By using this method, water-resistance of the coating film is improved. By introducing silyl groups of general formula (I) into the water-soluble resin, the water-resistance can be more improved.

To insure a more stable polymerization, the reaction is carried out in the presence of a redox catalyst at a temperature not more than 70 and preferably 40 to 65° C. To stabilize the silyl groups, pH of the emulsion is preferably adjusted to 5 to 8 during the polymerization reaction, and more preferably 6 to 7.

As examples of the above-mentioned redox catalyst, there may be mentioned such combination as potassium persulfate or ammonium persulfate with acid sodium sulfite or Rongalit, hydrogen peroxide with ascorbic acid, and an organic peroxide such as t-butyl hydroperoxide, benzoyl peroxide, cumene hydroperoxide, p-menthane hydroperoxide or the like with acid sodium sulfite or Rongalit. Especially the combination of an organic peroxide with a reducing agent is preferable for stabilizing polymerization. And in order to get catalyst activity constantly, a ferrous ion-containing compound such as ion sulfate and a chelating agent such as salt of ethylenediaminetetraacetate like disodium ethylenediaminetetraacetate can be used additively.

The proportion of said redox catalyst (initiator) is preferably 0.01 to 10% based on the total monomer weight, and more preferably 0.05 to 5%.

It is also possible to add a chain transfer agent to control the molecular weight of the polymer obtained from the polymerization.

As examples of the chain transfer agent, mentioned are mercaptans, sulfidebenzenes, isopropylbenzenes, chloroform, carbon tetrachloride, ferric chloride. Especially among the mercaptans, n-dodecylmercaptan, t-dodecylmercaptan, n-butylmercaptan, γ-mercaptopropyltrimethoxysilane, γ-mercaptopropyltriethoxysilane, γ-mercaptopropylmethyldimethoxysilane, and γ-mercaptopropylmethyldiethoxysilane are preferable from the view points of cost, odor and efficiency.

In the case of using the chain transfer agent, the preferable proportion is 0.01 to 10%. When the proportion is less than 0.01%, molecular weight controlling ability is decreased. When the proportion is more than 10%, water-resistance and durability will be decreased.

In this invention, the solid content of the emulsion is preferably 20 to 70%, and more preferably 30 to 60%. When the solid content is more than 70%, removing heat generated by polymerization reaction becomes difficult due to the marked rise of the viscosity of the system, and it takes a long time to remove the emulsion from the polymerization vessel. When the solid content is less than 20%, the operation problem does not occur. However, the amount of resin produced by one polymerization operation is small, and it is very disadvantageous in an economical point of view. Moreover, when applying the obtained composition to paint, the solid content below 20% makes the formed film thinner, and consequently some problems, such as, deterioration of film performances or of workability are caused. For instance, it is required to increase repeat time of painting to obtain desired thickness.

The obtained emulsion is composed of ultra fine particles having an average particle size of about 0.02 to 1.0 μm, thus having an excellent film forming ability.

Also by adding a curing agent to the composition of this invention just before painting, the crosslinking is accelerated. As the curing agent, organic metal compounds, acid catalysts and basic catalysts can be used. From the viewpoint of catalyst activity, organoaluminium compounds, organotin compounds and mixtures or reaction products of phosphoric acid ester and amine are preferable.

As examples of the organic metal compound, mentioned are organotin compounds such as dibutyl tin dilaurate, dibutyl tin dimaleate, dioctyl tin dilaurate, dibutyl tin diacetate, dibutyl tin dimethoxide, tributyl tin sulfite, dibutyl tin thio glycolate, dioctyltin, organoaluminium compounds such as aluminum isopropylate, aluminumtris (ethylacetoacetate), aluminumtris(acetylacetonate), ethylacetoacetate aluminum diisopropylate.

To retain catalyst activity and to get good storage stability, it is preferable that these organic tin compounds are previously emulsified by a surface active agent comprised of mainly an alkyl ether type agent and added to the composition just before using. The amount of the organic metal compound is preferably 0.01 to 10 parts by weight per 100 parts (parts by weight; hereinafter the same) of the solid content of silyl group-containing emulsion, and more preferably 0.1 to 5 parts.

As examples of mixtures or reactants of a phosphoric acid ester and amine are monobutyl phosphate, dibutyl phosphate, isopropylacid phosphate, di-2-ethylhexyl phosphate. And as examples of the amine, mentioned are hexylamine, triethylamine, N,N-dimethyldodecylamine, 3-propanolamine. The proportion of these mixtures or reactants is preferably 0.001 to 10 parts per 100 parts of the solid content of silyl group-containing emulsion and more preferably 0.01 to 5 parts. When the proportion of the curing agent is below 0.01 part, the catalyst activity is decreased, and when the proportion is more than 10 parts, the water-resistance is decreased.

Pigments usually used in paints (white pigments such as titanium dioxide, calcium carbonate, barium carbonate or kaoline, and color pigments such as carbon black, colcothar, phthalocyanine blue) can be added to the thus obtained curing composition. Titanium dioxide is the most popular and important among the pigments.

By using titanium dioxide surface-modified by alumina and/or zirconia, the gloss and weatherability are improved.

Additives which have been employed as usual paint components can be added in the composition, such as film-foaming agents, colloidal silica, plasticizers, solvents, dispersants, thickeners or thixotropic agents, antifoams, preservatives, or ultraviolet absorbers.

And for attaining fast curing, a silane coupling agent, a melamine resin or an isocianate compound can be employed as a crosslinking agent.

The composition of this invention can be applied to clear coating film or to an opaque coating film containing pigments. For example, the composition is used as coating or finishing materials for the interior of architectural structures, automobile uses such as metallic base coating or clear coating on the metallic base, direct coating onto metal, such as, aluminum and stainless steel, direct coating onto other materials, such as, slate, concrete, roofing tile, mortar, gypsum board, asbestos cement slate, asbestos board, precast concrete, light-weight cellular concrete, calcium silicate board, tile, brick and other ceramics, coating onto stone articles and other materials such as glass, natural marble, granite or as a surface modifier. The composition of this invention can be used not only for direct coating of materials, but also for coating on a water-based or solvent based primer, an acrylic rubber, a multi-layer top coat, a water-based or solvent-based penetrative water absorption inhibitor coat on an inorganic material such as concrete. And the composition can be used as adhesives and tackifiers.

Moreover, the composition can be blended with commercial aqueous coating materials, for example, thermosetting acrylic coatings, such as, acrylic or acrylmelamine resin coatings, alkyd, epoxy, fluororesin coatings, which can improve its weatherability, acid-resistance and solvent-resistance.

EXAMPLES

The following examples further illustrate the composition of the present invention and the method of preparing or producing the same. However, this invention is not limited to the range of examples.

Examples 1 to 10, Comparative Examples 1 to 6

A reactor equipped with a reflux condenser, a tube for introducing nitrogen gas and dropping funnel and stirrer was charged with 120 parts of deionized water, 0.7 parts of rongalit, 3 parts of NEWCOL-707SF, 0.6 parts of ammonium acetate, 0.7 parts of t-butyl hydroperoxide and a monomer mixture having the composition shown in Table 1. The charged mixture was heated to 50° C. with nitrogen gas and polymerization was carried out. After polymerizing for 1 hour, in Examples 1 to 8, 10 and Comparative Examples 1 to 6, 0.3 parts of t-butyl hydroperoxide and a monomer emulsion having the composition shown in Table 2 were added dropwise to the reactor for 3 hours.

Example 9 represents three-stage polymerization processes. After 1 hour polymerization of a monomer emulsion of the core shown in Table 1, the second stage monomer emulsion shown in Table 2 (the left column of example 9) and 0.2 parts of t-butyl hydroperoxide were added dropwise to the reactor for 2 hours, and the monomer emulsion of the outermost shell (the right column of example 9 in Table 2) and 0.1 part of t-butyl hydroperoxide was added dropwise for 1 hour.

Additional polymerization was conducted for 1 hour after the completion of the dropwise addition, and the obtained emulsion was adjusted to pH 7 by using aqueous ammonia, and was adjusted to 40% of solid content by using deionized water.

The obtained emulsion was evaluated with the following method. The results are shown in Table 3.

Evaluation Method (1) Polymerization Result (Stability during the Polymerization)

After the completion of polymerization, the emulsion was filtered through 200 mesh, and the weight of scale left on the mesh was measured. In the case that the scale amount is not more than 0.5% by weight based on total resin weight, a mark 'O' is shown in Table 3.

(2) Long-Term Storage Stability (Appearance)

The obtained emulsion was stored for 1 and 3 months at 50° C. respectively, then the appearance of the emulsion was observed visually.

(3) Long-Term Storage Stability (5° C. Film-Forming Ability)

After storing for 1 and 3 months at 50° C. respectively, 10 parts of CS12 (a film-forming agent produced by Chisso corporation) was added per 100 parts of emulsion (solid basis) and left overnight at 5° C. Then a glass plate was coated with the emulsion and kept overnight at 5° C., and the surface appearance was observed.

O: no cracking occurs
Δ: fine cracking occurs in part
x: cracking occurs all over the surface (4) Mechanical Stability According to JIS K 6392, the test was carried out using 10 Marlon tester at a load of 15 kg for 5 minutes. After the loading, the weight of the formed aggregate was measured and its proportion (ppm) to the solid content of the charged emulsion was calculated.

(5) White Enamel Gloss

The composition was mixed according to the recipe shown below and dispersed by using a sand mill for 1 hour by 1000 rpm to obtain a pigment paste. To 30 parts of the pigment paste, 60 parts of the emulsion, 2.4 parts of CS12, 3 parts of propylene glycol, 0.02 part of SN defoamer381, 4 parts of 20% UH420 (a thickener produced by Asahi Denka Kogyo Co., Ltd.) and 2.0 parts of 2% Thilose H4000P were added and the mixture was stirred to obtain white enamel coatings. Tin compounds emulsified according to Recipe 1 were added to the white enamel coating paints, and the paints were coated on glass plates. After leaving them for 1 day at room temperature and for 3 months at 50° C., 60 degree gloss was measured with a glossmeter.

Pigment paste recipe

| | |
|---|---|
| water | 16.5 parts |
| 14% aqueous ammonium | 0.3 parts |
| Laymal SMA1440H (a pigment wetting agent produced by ATOCHEM Corporation) | 4 parts |
| EmalgenA-60 (a pigment wetting agent produced by Kao Corporation) | 0.7 parts |
| SNdefoamer381 (a defoaming agent produced by San Nopco Co., Ltd.) | 0.3 parts |
| 2% Thilose H4000P (a thickening agent produced by Hoechst Japan) | 6.5 parts |
| Titanium dioxide (a pigment) | 72 parts |

Recipe 1

| | |
|---|---|
| Dibutyltin dilaurate | 10 parts |
| TD-10014 (a surfactant produced by Nippon Nyukazai Co., Ltd.) | 4 parts |
| TD-1006 (a surfactant produced by Nippon Nyukazai Co., Ltd.) | 6 parts |
| propylene glycol | 10 parts |
| deionized water | 70 parts |

(6) Water Resistance

In Examples 1 to 8, 10 and Comparative Examples 1 to 6, 0.4 gram of CS12 and 0.04 gram (solid content) of tin compound emulsified by homogenizer were added to 10 grams of the emulsion, and mixed together. In Example 9, 0.4 gram of CS12 and 0.4 gram of the solution shown in recipe 2 below were added to 10 grams of the emulsion, and mixed together. The mixture was coated onto the polyethylene sheet, and dried for 10 days at room temperature, then it was immersed in water for a day at room temperature. The water-resistance was measured by the proportion of increased weight to the weight of the film before immersion.

Recipe 2

| | |
|---|---|
| MP4 (a monobutyl phosphate produced by Daihati Kagaku Kogyo, Co., Ltd.) | 5 parts |
| 3-aminopropanol | 5 parts |
| deionized water | 90 parts |

TABLE 1

| Core monomer composition (parts) | Example | | | | | | | | | | Comparative example | | | | | |
|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 |
| Methyl methacrylate | 50 | 50 | 50 | 40 | 50 | 50 | 50 | 50 | 50 | 50 | 50 | 55 | 45 | 15 | 15 | 13 |
| Butyl acrylate | 40 | 40 | 40 | 30 | 40 | 40 | 40 | 40 | 40 | 40 | 40 | 45 | 40 | 15 | 15 | 12 |
| Butyl methacrylate | — | — | — | — | — | — | — | — | — | — | — | — | — | 65 | 65 | 65 |
| γ-methacryloxy propyl trimethoxysilane | — | — | — | — | — | — | — | — | — | — | — | 5 | 5 | 5 | — | |

TABLE 1-continued

| Core monomer composition (parts) | Example | | | | | | | | | | Comparative example | | | | | |
|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 |
| γ-methacryloxy propyl triethoxysilane | 10 | — | — | 20 | 10 | 10 | 10 | 10 | 10 | 10 | 10 | — | — | — | — | 10 |
| Vinyltriethoxysilane | — | 10 | — | — | — | — | — | — | — | — | — | — | — | — | — | — |
| γ-methacryloxy propyl tri-i-propoxysilane | — | — | 10 | — | — | — | — | — | — | — | — | — | — | — | — | — |

TABLE 2

| Monomer emulsion composition of the second stage and the outermost shell (parts) | Example | | | | | | | | | | Comparative example | | | | | |
|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 |
| Methyl methacrylate | 38 | 38 | 38 | 33 | 26 | 28 | 38 | 38 | 24 | 14 | 46 | 40 | 40 | 40 | 13 | 10 | 10 |
| Butyl acrylate | 28 | 28 | 28 | 23 | 20 | 28 | 28 | 28 | 18 | 10 | 35 | 30 | 36 | 31 | 13 | 11 | 11 |
| Butyl methacrylate | 20 | 20 | 20 | 20 | 40 | 20 | 20 | 20 | 12 | 8 | 5 | 20 | 20 | 20 | 65 | 65 | 65 |
| Styrene | — | — | — | — | — | 10 | — | — | — | — | — | — | — | — | — | — | — |
| γ-methacryloxy propyl trimethoxysilane | — | — | — | — | — | — | — | — | — | — | — | — | — | 5 | 5 | — | — |
| γ-methacryloxy propyl triethoxysilane | 10 | — | — | 20 | 10 | 10 | 10 | 10 | 6 | 4 | 10 | 10 | — | — | — | 10 | 10 |
| Vinyltriethoxysilane | — | 10 | — | — | — | — | — | — | — | — | — | — | — | — | — | — | — |
| γ-methacryloxy propyl tri-i-propoxysilane | — | — | 10 | — | — | — | — | — | — | — | — | — | — | — | — | — | — |
| MA-50*1 | 4 | 4 | 4 | 4 | 4 | 4 | 4 | 4 | — | 4 | 4 | — | 4 | 4 | 4 | 4 | 4 |
| Water | 60 | 60 | 60 | 60 | 60 | 60 | 60 | 60 | 36 | 24 | 60 | 60 | 60 | 60 | 60 | 60 | 60 |
| N-707SF*2 | 1.6 | 1.6 | 1.6 | 1.6 | 1.6 | 1.6 | — | — | 1.0 | 0.6 | 1.6 | 1.6 | 1.6 | 1.6 | 1.6 | 1.6 | 1.6 |
| Sodium dodecylbenzene sulfonate | — | — | — | — | — | — | 1.6 | — | — | — | — | — | — | — | — | — | — |
| HS-10*3 | — | — | — | — | — | — | — | 1.6 | — | — | — | — | — | — | — | — | — |

*1MA-50: a hydrophilic vinyl monomer containing polyoxyethylene chain (produced by Nippon Nyukazai Co., Ltd.)
2N-707SF: an anionic surfactant containing polyoxyethylene chain (produced by Nippon Nyukazai Co, Ltd.)
3HS-10: a reactive surfactant (produced by Dai-ichi Kogyo Seiyaku Co., Ltd.)

TABLE 3

| Results of evaluation | Example | | | | | | | | | | Comparative example | | | | | |
|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 |
| polymerization results | ○ | ○ | ○ | ○ | ○ | ○ | ○ | ○ | ○ | ○ | ○ | ○ | ○ | ○ | ○ | ○ |
| Storage stability (1 month) Appearance | ○ | ○ | ○ | ○ | ○ | ○ | ○ | ○ | ○ | ○ | ○ | ○ | ○ | ○ | ○ | ○ |
| Storage stability (1 month) Film-forming ability (5° C.) | ○ | ○ | ○ | ○ | ○ | ○ | ○ | ○ | ○ | ○ | ○ | ○ | X | ○ | ○ | ○ |
| Storage stability (3 months) Appearance | ○ | ○ | ○ | ○ | ○ | ○ | ○ | ○ | ○ | ○ | ○ | ○ | ○ | ○ | ○ | ○ |
| Storage stability (3 months) Film-forming ability (5° C.) | ○ | ○ | ○ | ○ | ○ | ○ | ○ | ○ | ○ | ○ | ○ | ○ | X | X | X | ○ |
| White enamel gloss | 80 | 80 | 80 | 75 | 75 | 80 | 80 | 75 | 80 | 75 | 20 | 80 | 80 | 75 | 75 | 70 |
| White enamel gloss after storage (50° C. × 3 months) | 80 | 80 | 80 | 75 | 70 | 75 | 80 | 75 | 75 | &0 | 20 | 75 | 15 | 15 | 20 | 70 |
| Mechanical property (ppm) | 25 | 20 | 25 | 10 | 30 | 25 | 20 | 15 | 20 | 20 | 25000 | 50 | 20 | 60 | 60 | 50 |
| Water resistance (%) | 7 | 10 | 7 | 5 | 7 | 7 | 9 | 8 | 6 | 10 | 8 | 90 | 7 | 7 | 8 | 8 |

INDUSTRIAL APPLICABILITY

The room temperature curing composition of this invention has a stable silyl group and a much improved film-forming ability after long-term storage. Also the composition shows excellent mechanical stability, water-resistance, durability and white enamel gloss. Thus the composition can be widely applied to the surfaces of architectural structures, automobiles, household electric appliances, plastic products and so on.

We claim:

1. A room temperature curing composition obtained from multistage emulsion polymerization of a monomer composition which comprises a core monomer composition comprising 1 to 30% by weight of (A) vinyl monomer containing silyl group of general formula (I) shown below and 70 to 99% by weight of (B) vinyl monomer copolymerizable with component (A), (B), as a component of the monomer composition in the core, comprising 0 to 55% by weight of component (C) based on the total monomer amount of the core, component (C) being at least one monomer selected from alkylmethacrylate containing alkyl group which has no fewer than 4 carbon atoms, and cycloalkylmethacrylate containing cycloalkyl group which has no fewer than 4 carbon atoms, and an outermost shell monomer composition comprising 0.1 to 30% by weight of (A) vinyl monomer containing silyl group of formula (I) shown below, 40 to 99.4% by weight of (B) vinyl monomer copolymerizable with component (A), 0.5 to 30% by weight of (D) at least one hydrophilic vinyl monomer selected from α,β-ethylenically unsaturated carboxylic acid, styrenesulfonic acid, vinylsulfonic acid, sodium styrene sulfonic acid, 2-sulfoethylmethacrylate sodium, 2-sulfoethylmethacrylate ammonium, (meth)acrylamide, N-methylol(meth)acrylamide, dialkylaminoalkyl methacrylate, dialkylaminoalkyl methacrylate hydrochlorides, 2-aminoethyl methacrylate hydrochlorides, polyoxyethylene chain-containing vinyl monomers or polyoxypropylene chain-containing vinyl monomers, and as a part of (B) component in monomer composition of the outermost shell, 15 to 55% by weight of component (C) is contained based on the total monomer amount of the outermost shell, said component (C) being at least one monomer selected from alkylmethacrylate containing alkyl group which has no fewer than 4 carbon atoms, and cycloalkylmethacrylate containing cycloalkyl group which has no fewer than 4 carbon atoms;

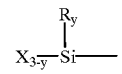

(I)

wherein R represents a monovalent hydrocarbon group selected from alkyl group containing 1 to 10 carbon atoms, aryl group or aralkyl group; X represents a group selected from ethoxy, n-propoxy or iso-propoxy, y represents an integer of 0 to 2; when two or more X and R groups bound to Si respectively, they may be the same or different.

2. The room temperature curing composition as claimed in claim 1, wherein said hydrophilic vinyl monomer (D) is a vinyl monomer containing polyoxyethylene chain and said emulsion is obtained by copolymerization using an anionic surfactant containing polyoxyethylene chain.

3. The room temperature curing composition as claimed in any one of claims 1 or 2, wherein a reactive surfactant containing polyoxyethylene chain is used in the polymerization.

4. The room temperature curing composition as claimed in any one of claims 1 or 2, further comprising a curing agent.

5. The room temperature curing composition as claimed in claim 4, wherein the curing agent is an organoaluminum compound or an organotin compound emulsified by a surface active agent mainly comprised of an alkyl ether agent.

6. The room temperature curing composition as claimed in claim 4, wherein the curing agent is a mixture or a reaction product of phosphoric acid ester and amine.

* * * * *